United States Patent
Merlo

(10) Patent No.: US 7,062,956 B2
(45) Date of Patent: Jun. 20, 2006

(54) TIRE TESTING MACHINE WITH REMOVABLE HANGER HOIST AND METHOD FOR LOADING A TIRE

(75) Inventor: James T. Merlo, Norton, OH (US)

(73) Assignee: Bridgestone Firestone North American Tire, LLC, Nashville, TN (US)

(*) Notice: Subject to any disclaimer, the term of this patent is extended or adjusted under 35 U.S.C. 154(b) by 0 days.

(21) Appl. No.: 10/989,211

(22) Filed: Nov. 15, 2004

(65) Prior Publication Data

US 2006/0107735 A1    May 25, 2006

(51) Int. Cl.
*E01C 23/00* (2006.01)

(52) U.S. Cl. .................................................. 73/146
(58) Field of Classification Search .............. 73/146, 73/146.5, 146.3, 440–444
See application file for complete search history.

(56) References Cited

U.S. PATENT DOCUMENTS

| | | | |
|---|---|---|---|
| 2,951,672 A | 9/1960 | Bott | |
| 3,258,287 A | 6/1966 | Crosby | |
| 3,604,249 A * | 9/1971 | Wilson | 73/582 |
| 3,662,597 A * | 5/1972 | DeGhetto | 73/146 |
| 3,891,176 A | 6/1975 | Downing et al. | |
| 3,907,118 A | 9/1975 | Pelavin | |
| 3,977,243 A * | 8/1976 | Yamada et al. | 73/146 |
| 4,032,100 A | 6/1977 | Kahn | |
| 4,306,826 A | 12/1981 | Detwiler | |
| 4,387,873 A | 6/1983 | Pavlo et al. | |
| D376,558 S | 12/1996 | Elsea | |
| 5,681,141 A | 10/1997 | Critel | |
| 5,782,447 A | 7/1998 | Hoffend | |
| 5,967,481 A | 10/1999 | Lobo | |
| 6,673,182 B1 | 1/2004 | Merendino, Sr. | |
| 2003/0155475 A1 | 8/2003 | Hicks | |
| 2003/0188574 A1 | 10/2003 | Weiss | |
| 2004/0016293 A1 | 1/2004 | Weiss | |
| 2004/0032138 A1 | 2/2004 | Bancroft | |

* cited by examiner

*Primary Examiner*—Jewel V. Thompson
(74) *Attorney, Agent, or Firm*—Fred H. Zollinger, III; Timothy R. Krogh

(57) ABSTRACT

A tire testing machine includes a spindle adapted to rotatably support a tire. The machine has a frame defining an opening that allows the tire to be loaded onto the spindle and unloaded from the spindle with the frame having an upper frame member that spans at least a portion of the opening. A hoist hanger is removably connected to the upper frame member. The hoist hanger is adapted to removably support a tire hoist that allows the tire to be supported while it is unloaded from the spindle and the machine. The hoist hanger includes a support bracket slidably disposed over the upper frame member and a support arm that extends inwardly toward the spindle of the machine. The hanger configuration provides a compact design that allows tires to be securely and safely moved with a hoist.

21 Claims, 4 Drawing Sheets

TIRE TESTING MACHINE WITH REMOVABLE HANGER HOIST AND METHOD FOR LOADING A TIRE

BACKGROUND OF THE INVENTION

1. Technical Field

The present invention generally relates to tire testing machines and, more particularly, to tire testing machines that require the tire to be tested to be lifted and mounted on a rotatable spindle. Specifically, the present invention relates to a tire testing machine and a removable hoist hanger used to load and unload tires from the test machines.

2. Background Information

One group of tire testing machines has a rotatable spindle that supports the tire during the tire test. The spindle is typically disposed in a protective safety cage that also houses a movable test surface against which the tire is engaged. The protective cage includes a structural frame having an upper frame member disposed above a gate opening. The gate opening allows a tire to be loaded into the cage onto the spindle where the tire may be tested. The tire is also removed from the cage through the gate opening. An exemplary test machine is sold by Test Measurement Systems, Inc. of Akron, Ohio, as model no. TTM-1.0TP2 (viewable at www.tmsi-usa.com). This machine has a safety gate that slides back and forth over the gate opening. Some safety gates have a vertical and horizontal component with the horizontal component covering the top of the test area when the gate is closed.

The tire is typically mounted to a rim and the combination may weigh up to 85 pounds. Workers have a difficult time loading and unloading these tires because of the weight and the location of the spindle. The process of loading and unloading tires has caused injuries. Repetitive tire loading and unloading can also cause injuries to the workers. One solution to ease the loading and unloading process is to position a crane above each test machine. Although this solution allows a single worker to easily load and unload a tire, the cost and time to install the crane is a significant disadvantage. Some tire test facilities have many tire test machines and the cost of a crane for each machine outweighs its benefits. Further, some test facilities do not have sufficient room above the test machines for the installation of a crane. There is little room to install a crane or a hoist hanger on the machines that use the gate having the horizontal component that slides back and forth over the top of the test area. Workers thus desire a solution that assists them in loading and unloading the tires from the tire testing machines.

BRIEF SUMMARY OF THE INVENTION

The invention provides a method and apparatus for loading a tire into and unloading a tire from a tire testing machine. In one embodiment, the invention provides a method used with a tire testing machine having a spindle adapted to rotatably support the tire to be tested, a frame that define a gate opening, and an upper frame member that spans at least a portion of the gate opening. In one embodiment, the method includes the steps of removably connecting a hoist hanger to the upper frame member; the hoist hanger having a hoist support; connecting a hoist to the hoist support; lifting a tire with the help of the hoist; mounting the tire onto the spindle; removing the tire from the hoist after the tire is supported by the spindle; removing the hoist hanger from the frame; testing the tire; re-connecting the hoist hanger and hoist to the upper frame member; connecting the tire to the hoist; lifting the tire from the spindle with the help of the hoist; and removing the tire from the machine.

The invention also provides a hanger that is removably attachable to a tire testing machine in a manner that allows a tire hoist to be readily supported by the hanger in a position to assist in the loading and unloading of the tire.

In another embodiment, the invention provides a removable hoist hanger for use with an upper frame member on a tire testing machine. The hanger includes a support bracket adapted to removably engage the upper frame member with the support bracket having an outer leg, an upper bridge, and an inner leg. The outer leg is longer than the inner leg. A support arm extends from the inner leg of the support bracket. A frame clamp is supported by the outer leg. The clamp has a clamping member adapted to selectively engage the upper frame member to securely connect the hanger to the tire testing machine.

Another embodiment of the invention provides a removable hoist hanger for use with a frame member on a tire testing machine wherein the hanger includes a support bracket adapted to removably engage the frame member with the support bracket having an outer leg and an inner leg connected to an upper bridge. A support arm is connected to the inner leg. A frame clamp is supported by the outer leg with the clamp having a clamping member adapted to selectively engage the frame member to securely connect the hanger to the tire testing machine. The frame clamp is disposed at a first distance from the upper bridge and the support arm is disposed a second distance from the upper bridge with the first distance being longer than the second distance.

BRIEF DESCRIPTION OF THE SEVERAL VIEWS OF THE DRAWINGS

Similar numbers refer to similar parts throughout the specification.

DETAIL DESCRIPTION OF THE INVENTION

Figure 1:
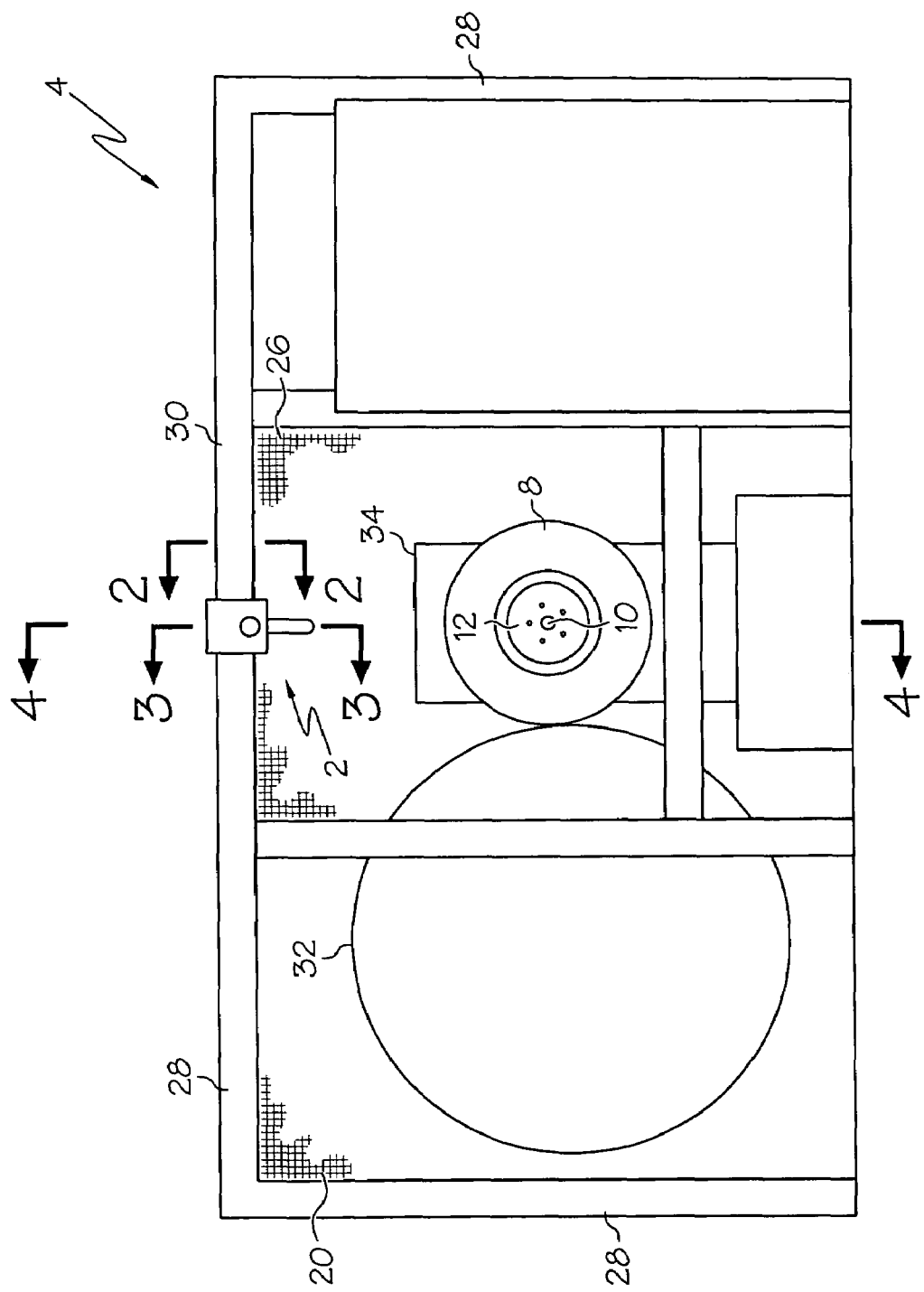
FIG. 1 is a front view of a tire testing machine with a removable hanger hoist connected to the upper frame member above the gate opening.

The removable hoist hanger of the invention is indicated generally by the numeral 2 in the accompanying drawings. Hoist hanger 2 is configured to be removably connected to a tire testing machine 4. Hoist hanger 2 allows a hoist 6 to be selectively used with machine 4 during the loading of a tire 8 onto and the unloading of a tire 8 from a spindle 10 (or other structure) that supports tire 8 during the tire test. In the context of this application the term spindle is broadly used to refer to any structure that rotatably supports a tire in a tire test machine. Most spindles engage the center of a rim that supports the tire. Tire 8 is typically mounted to a rim 12 that significantly increases the weight that must be moved onto spindle 10. Hoist 6 includes a hook or a loop 14 designed to securely engage tire 8 or rim 12 so that tire 8 may be lifted by hoist 6.

Figure 2:
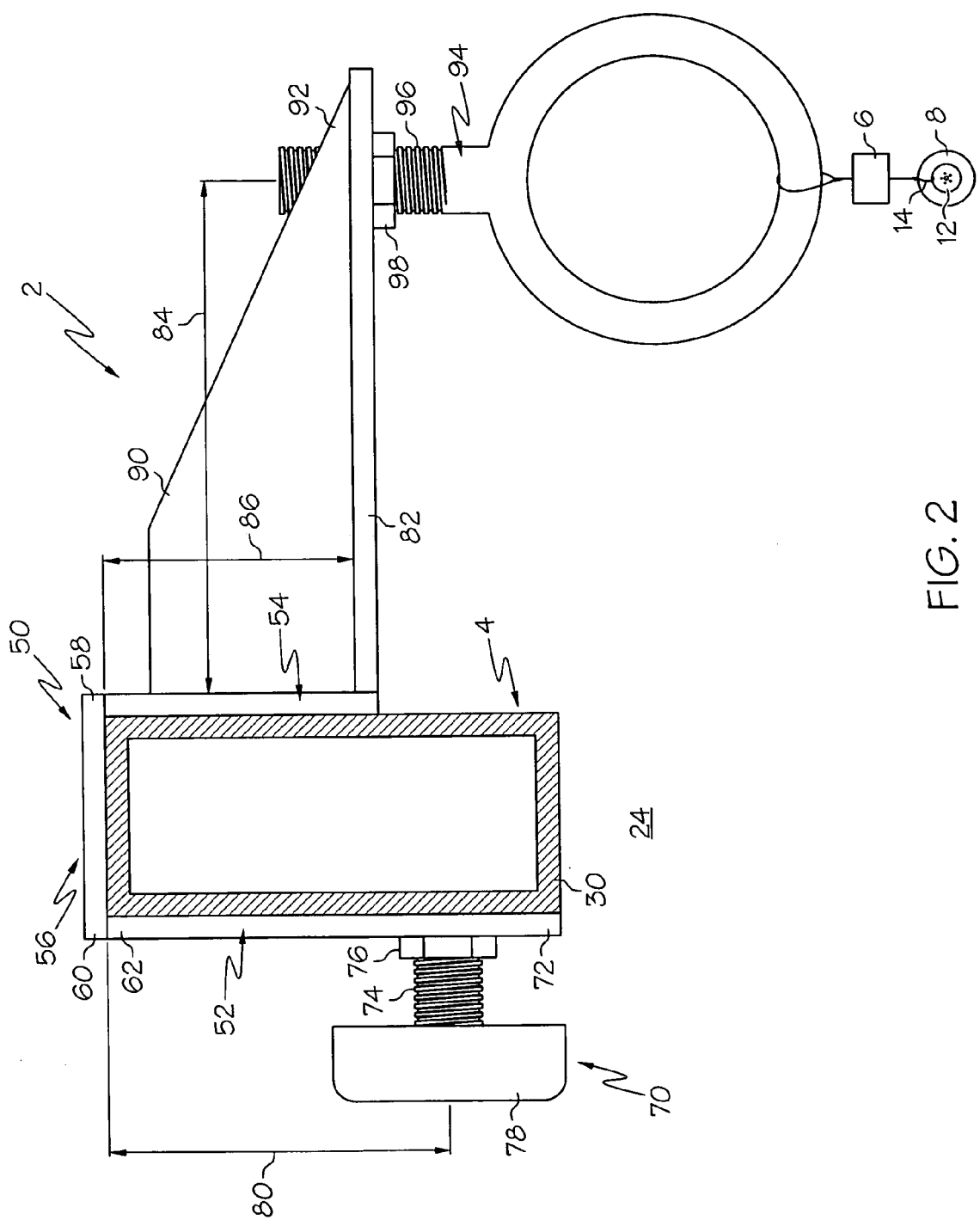
FIG. 2 is a section view taken along line 2—2 of FIG. 1.
Figure 3:
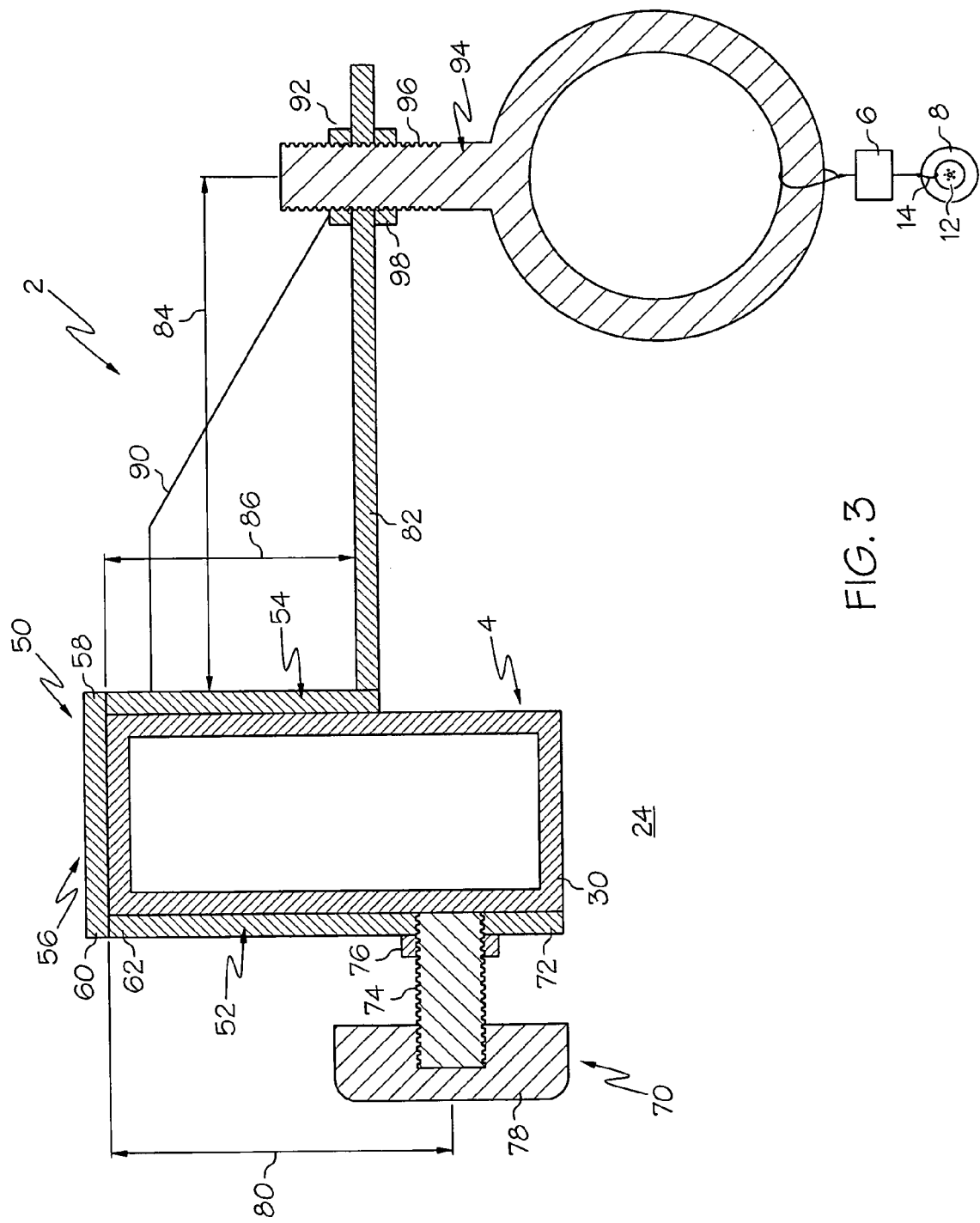
FIG. 3 is a section view taken along line 3—3 of FIG. 1.

In addition to spindle 10, tire testing machine 4 generally includes a safety cage 20 that includes a gate opening 24 with a gate 26 selectively positionable across opening 24. As discussed above, gate 26 may include a horizontal component that is disposed above spindle 10 when gate 26 is closed. Machine 4 also includes a frame 28 having at least one upper frame member 30 disposed across the top of opening 24. In the exemplary embodiment of the invention, upper frame member 30 is rectangular in cross section (a cross section taken normal to the longitudinal axis of member 30) with a width that is less than its height as shown in FIGS. 2 and 3. A movable test surface 32 is disposed inside safety cage such that tire 8 may be engaged with and run against test surface 32. A drive motor 34 may be used to drive tire 8 against surface 32 or surface 32 may be rotated against tire 8. Machine 4 may include any of a variety of spindles 10 and test surfaces 32.

Removable hoist hanger 2 generally includes a support bracket 50 that removably engages upper frame member 30. In the exemplary embodiment, bracket 30 slides over the top of frame member 30. Bracket 50 includes an outer leg 52 and inner leg 54 connected to an upper bridge 56. Inner leg 54 may be ⅗ the length of outer leg 52. Upper bridge 56 has an inner end 58 and an outer end 60. In the exemplary embodiment, upper bridge 56 has a length that is just longer than the width of frame member 30 in addition to the thicknesses of outer leg 52 and inner leg 54 so that support bracket 50 slidably engages frame member 30 without significant slop. The upper end 62 of outer leg 52 is connected to upper bridge 56 at a location adjacent to outer end 60 and the upper end 64 of inner leg 54 is connected to upper bridge 56 at a location adjacent to inner end 58. In the exemplary embodiment, legs 52 and 54 may be welded essentially flush with ends 58 and 60. Each leg and bridge may have a width of 3½ inches. Outer leg 52 may be 5 inches long with inner leg being 3 inches long. Bridge 56 may be 2¾ inches long. The thickness of each part may be ¼ inch when fabricated from steel.

A frame clamp 70 is connected to outer leg 52 at a location closer to the lower end 72 of outer leg 52 than upper end 62. Frame clamp 70 allows bracket 50 to be tightened against frame member 30. In the exemplary embodiment, frame clamp 70 includes a threaded clamping member 74 that threadedly engages a threaded support block 76. Member 74 may be a ⅝ bolt that is 2 inches long. Block 76 is secured to outer leg 52 while threaded clamping member 74 may be rotated to tighten and loosen clamping member 74 directly against frame member 30 as shown in FIG. 3. A handle 78 may be connected to clamping member 74 to allow the worker to easily tighten and loosen clamping member 74.

Clamp 70 is spaced a first distance 80 from upper bridge 56 while a support arm 82 is connected to inner leg 54 at a second distance 86 from upper bridge 56. First distance 80 may be longer than second distance 86 to provide frame clamp 70 with leverage and to prevent support bracket 50 from twisting off upper frame member 30.

Support arm 82 is securely attached to inner leg 54 and may be reinforced with a brace 90 hat extends between inner leg 54 and support arm 82. Support arm may have the same 3½ inch width as legs 52 and 54. Arm 82 may be 7 inches long. The outer end 92 of brace 90 is disposed farther from inner leg 54 than a hoist support 94 that is securely connected to support arm 82. Hoist support 94 is spaced from inner leg 54 a third distance 84 that is longer than first distance 80. Distance 84 may be 5¾ inches. Hoist support 94 may include a threaded member 96 that threadedly engages a threaded support block 98. Member 96 also may be a ⅝ inch bolt. Hoist support 94 may include any of a variety of hook or ring shapes onto which hoist 6 may be selectively attached.

Figure 4:
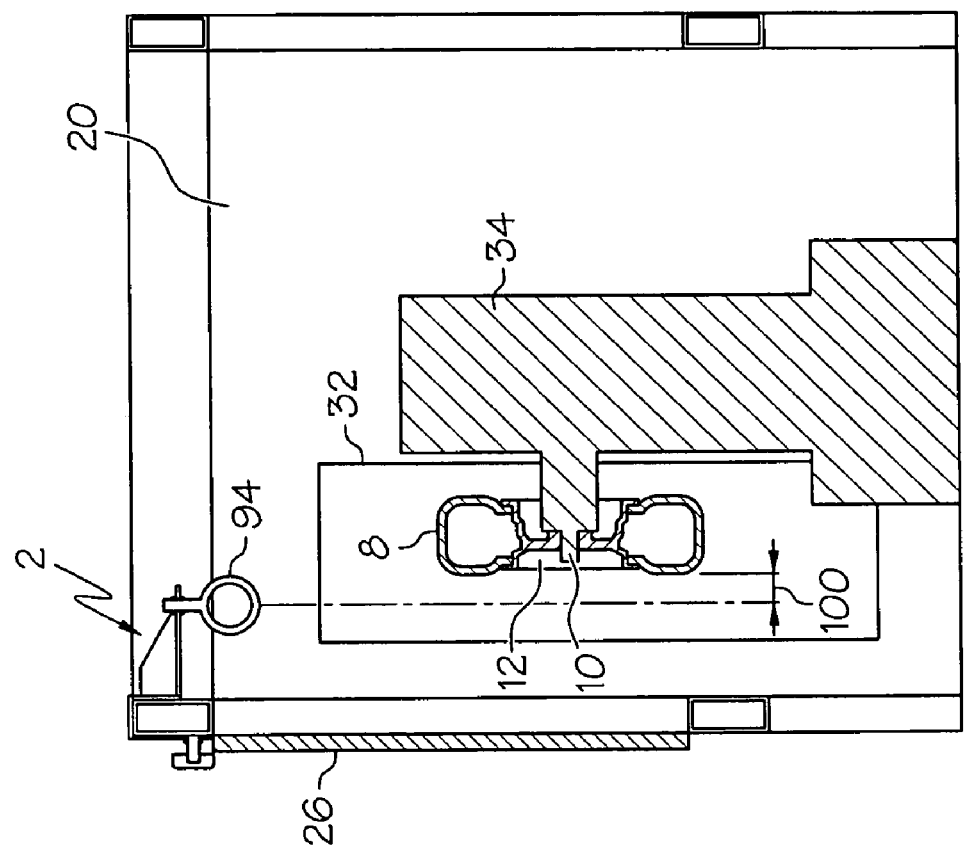
FIG. 4 is a section view taken along line 4—4 of FIG. 1.

Arm 82 and distance 84 are configured to hoist support 94 in an offset position from the outer end of spindle 10 as shown in FIG. 4. The offset is represented by dimension line 100 in FIG. 4. Hanger 2 is used by removably connecting hanger 2 to frame member 30 in a position aligned with the rotational axis of spindle 10 as shown in FIG. 1. The user may then connect hoist 6 to hoist support 94. Hoist 6 is then used to lift tire 8 into test machine 4 where tire 8 may be mounted to spindle 10. Hoist 6 is then detached from tire 8 and removed from hanger 2. The user then removes hanger 2 from machine 4 and runs the test on tire 8. Hanger 2 is then re-connected to frame member 30 and hoist 6 is reattached to tire 8. The user may then use hoist 6 to lift tire 8 while tire 8 is being removed from machine 4. Hanger 2 thus eliminates some of the heavy lifting for the worker and makes the process safer. Hanger 2 may also be used on a plurality of similar test machines 4 to significantly reduce the costs of using the hoists 6 with tire 8.

From the foregoing description, those skilled in the art will recognize that the invention solves many of the problems described above. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

The invention claimed is:

1. A removable hoist hanger for use with a frame member on a tire testing machine; the hanger comprising:
   a support bracket adapted to removably engage the frame member; the support bracket having an outer leg, an upper bridge; and an inner leg;
   the upper bridge having an inner end and an outer end;
   the outer leg being connected to the upper bridge at a location adjacent the outer end of the upper bridge;
   the inner leg being connected to the upper bridge at a location adjacent the inner end of the upper bridge;
   a frame clamp supported by the outer leg; the clamp having a clamping member adapted to selectively engage the frame member to securely connect the hanger to the tire testing machine;
   the outer leg being longer than the inner leg;
   the inner leg having a lower end;
   a support arm having an inner end and an outer end;
   the inner end of the support arm being connected to the inner leg at a location adjacent the lower end of the inner leg; and
   a hoist support connected to the support arm.

2. The hanger of claim 1, wherein the frame clamp is disposed at a first distance from the upper bridge and the support arm being disposed a second distance from the upper bridge; the first distance being longer than the second distance.

3. The hanger of claim 2, wherein the hoist support is disposed at a third distance from the inner leg; the third distance being longer than the first distance.

4. The hanger of claim 1, further comprising a brace extending between the inner leg and the support arm.

5. The hanger of claim 4, wherein the brace has an outer end; hoist support being disposed intermediate the outer end of the brace and the inner leg of the support bracket.

6. The hanger of claim 1, wherein the length of the inner leg is ⅗ the length of the outer leg.

7. The hanger of claim 1, wherein the frame clamp includes a threaded clamping member and a threaded support block; the threaded support block being connected to the outer leg; the threaded clamping member passing through the threaded support block such that the threaded clamping member may selectively engage the frame member.

8. The hanger of claim 7, wherein the frame clamp further includes a handle connected to the threaded clamping member; the handle allowing the threaded clamping member to be rotated.

9. The hanger of claim 1, wherein the hoist support includes a ring disposed below the support arm.

10. The hanger support of claim 9, wherein the hoist support includes a threaded rod connected to the ring; a threaded support block connected to the support arm; the support block being disposed between the ring and the support arm.

11. A tire testing machine for testing a tire; the machine comprising:
    a spindle adapted to rotatably support the tire to be tested;
    a frame defining an opening that allows the tire to be loaded onto the spindle and unloaded from the spindle;
    the frame having an upper frame member that spans at least a portion of the opening; and
    a hoist hanger removably connected to the upper frame member; the hoist hanger adapted to removably support a tire hoist that allows the tire to be supported while it is unloaded from the spindle and the machine.

12. A tire testing machine for testing a tire; the machine comprising:
    a spindle adapted to rotatable support the tire to be tested;
    a frame defining an opening that allows the tire to be loaded onto the spindle and unloaded from the spindle;
    the frame having an upper frame member that scans at least a portion of the opening; and
    a hoist hanger removably connected to the upper frame member; the hoist hanger adapted to removably support a tire hoist that allows the tire to be supported while it is unloaded from the spindle and the machine;
    wherein the hanger includes:
    a support bracket slidably disposed over the upper frame member; the support bracket having an outer leg, an upper bridge; and an inner leg; the upper bridge disposed on top of the upper frame member;
    the upper bridge having an inner end and an outer end;
    the outer leg being connected to the upper bridge at a location adjacent the outer end of the upper bridge;
    the inner leg being connected to the upper bridge at a location adjacent the inner end of the upper bridge;
    a frame clamp supported by the outer leg; the clamp having a clamping member adapted to selectively engage the frame member to securely connect the hanger to the tire testing machine;
    the inner leg having a lower end;
    a support arm having an inner end and an outer end;
    the inner end of the support arm being connected to the inner leg at a location adjacent the lower end of the inner leg; and
    a hoist support connected to the support arm.

13. The machine of claim 12, wherein the hoist hanger includes a support arm aligned with the rotational axis of the spindle.

14. The machine of claim 13, wherein the support arm has an inner end and an outer end; the outer end being disposed above and offset from the spindle.

15. The machine of claim 14, wherein the outer end of the support arm is offset from the spindle in a direction toward the opening of the frame.

16. The machine of claim 12 wherein the outer leg being longer than the inner leg.

17. The machine of claim 16, wherein the frame clamp is disposed at a first distance from the upper bridge and the lower end of the inner leg is disposed a second distance from the upper bridge; the first distance being longer than the second distance.

18. The hanger of claim 17, wherein the hoist support is disposed at a third distance from the inner leg; the third distance being longer than the first distance.

19. A removable hoist hanger for use with a frame member on a tire testing machine; the hanger comprising:
    a support bracket adapted to removably engage the frame member; the support bracket having an outer leg, an upper bridge; and an inner leg;
    the upper bridge having an inner end and an outer end;
    the outer leg being connected to the upper bridge at a location adjacent the outer end of the upper bridge;
    the inner leg being connected to the upper bridge at a location adjacent the inner end of the upper bridge;
    a support arm having an inner end and an outer end;
    the inner end of the support arm being connected to the inner leg;
    a frame clamp supported by the outer leg; the clamp having a clamping member adapted to selectively engage the frame member to securely connect the hanger to the tire testing machine; and
    the frame clamp being disposed at a first distance from the upper bridge and the support arm being disposed a second distance from the upper bridge; the first distance being longer than the second distance.

20. A method of loading an unloading a tire from a testing machine wherein the tire testing machine has a spindle adapted to rotatably support the tire to be tested; a frame defining an opening that allows the tire to be loaded onto the spindle and unloaded from the spindle; the frame having an upper frame member that spans at least a portion of the opening; the method comprising the steps of:
    removably connecting a hoist hanger to the upper frame member; the hoist hanger having a hoist support;
    connecting a hoist to the hoist support;
    lifting a tire with the help of the hoist;
    mounting the tire onto the spindle;
    removing the tire from the hoist after the tire is supported by the spindle;
    removing the hoist hanger from the frame;
    testing the tire;
    re-connecting the hoist hanger and hoist to the upper frame member;
    connecting the tire to the hoist;
    lifting the tire from the spindle with the help of the hoist; and
    removing the tire from the machine.

21. The method of claim 20, further comprising the step of clamping the hoist hanger to the upper frame member.

* * * * *